United States Patent
Fowble, III

(10) Patent No.: US 6,286,608 B1
(45) Date of Patent: Sep. 11, 2001

(54) SOD BUSTER APPARATUS

(76) Inventor: William A. Fowble, III, 17200 Falls Rd., Upperco, MD (US) 21155

( * ) Notice: Subject to any disclaimer, the term of this patent is extended or adjusted under 35 U.S.C. 154(b) by 0 days.

(21) Appl. No.: 09/591,793

(22) Filed: Jun. 12, 2000

(51) Int. Cl.[7] .................................................. A01B 63/16
(52) U.S. Cl. ...................... 172/675; 172/576; 172/799.5; 172/452
(58) Field of Search .................... 172/452, 397, 172/395, 776, 605, 684.5, 699, 675, 669, 551, 576, 799.5, 136, 139

(56) References Cited

U.S. PATENT DOCUMENTS

| | | | |
|---|---|---|---|
| 1,711,071 | * | 4/1929 | Walker ................................ 172/776 |
| 2,672,084 | * | 3/1954 | Forgy ...................................... 97/78 |
| 2,970,658 | * | 2/1961 | Kopaska ............................. 172/456 |
| 3,266,180 | * | 8/1966 | Toland .................................. 37/153 |
| 3,589,451 | * | 6/1971 | Wenzel ............................... 172/285 |
| 3,698,489 | * | 10/1972 | Norrell et al. ..................... 172/656 |
| 3,766,989 | * | 10/1973 | Lepp ................................... 172/605 |
| 4,200,157 | | 4/1980 | Anderson . |
| 4,228,861 | * | 10/1980 | Hart ..................................... 172/662 |
| 4,520,742 | | 6/1985 | Anderson . |
| 4,524,837 | | 6/1985 | Harden . |
| 4,608,933 | | 9/1986 | Wyrill, III . |
| 4,801,126 | | 1/1989 | Rosman . |
| 5,427,184 | * | 6/1995 | Peck .................................... 172/395 |
| 5,540,288 | | 7/1996 | Dietrich, Sr. . |
| 5,954,139 | | 9/1999 | Forsyth . |
| 6,012,534 | | 1/2000 | Kovatch et al. . |

* cited by examiner

*Primary Examiner*—Victor Batson

(57) ABSTRACT

This invention relates to an invention of a novel detachable garden type chisel plow that is towed behind a small farm or garden tractor unit. This invention has an independent self raising gas pressurized lift jacks mechanism attached to one chisel point shank plow which can be easily lowered by the tractor operator using the plow engagement rope. The lifting device of this invention utilizes two gas pressurized lift jacks thereby avoiding the need for a hydraulic system or other power lift system. The novel apparatus of this invention also has the capability to receive and utilize additional optional attachments such as a tilling disk apparatus, drag chain attachment, and useful farming other like devices. The apparatus of this invention works with a small farm or garden tractor unit equipped with a plate or bar tow capability having only a small diameter hole in the tow plate or tow bar and does not require a three point hitch or type of lift mechanism.

16 Claims, 4 Drawing Sheets

SOD BUSTER APPARATUS

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

The present invention relates to farm and garden plows that are towed behind a garden or small farm tractor. Typical uses of this type of chisel plow are plowing furrows for relatively small farms or gardens. The convenience of being able to hook-up a detachable garden plow to a small multi-purpose tractor is an important factor. This invention relates to a detachable garden type chisel plow, which has an object to assist the user in performing several different small farm or garden tasks.

2. Description of the Prior Art

In the prior art, most farm and garden plows have been designed with a singular purpose such as plowing of a single furrow for subsequent planting. Such a disclosure is made in U.S. Pat. No. 6,012,534, which has a single chisel plow shank with a pair of spring, based narrow wheels mounted on either side of the chisel plow shank. The wheels firm up the surface of the berm formed by the chisel plow without reducing the depth of the furrow. This minimum soil displacement plow has small narrow wheels positioned at the rear of the chisel plow point and with the plow shank in a slight downward bias by means of a cushion spring to firm the surface of the berm without substantially compacting the soil. This patent does not teach the use of independent self raising gas pressurized lift jacks mechanism attached to a chisel point plow, nor the convenient small garden tractor plate tow capability or trailer. It is patently distinct from the present invention, which is designed to perform multiple and varying tasks.

Other types of plows such as shown in U.S. Pat. No. 5,954,139. Which is for a device for tilling with large tractors with a hydraulic, reset mechanism. This patent reveals a hydraulic system with a pressure relief valve that is activated when the tillage instruments engage obstructions. This patent shows multiple tillage wheels and a soil-engaging knife for plowing multiple rows in one pass. This patent does not reveal the use of independent self-raising gas pressurized lift jacks mechanism attached to a chisel point plow. Also, it reveals the use of the conventional three-point hitch of a tractor not the plate tow capability with a small diameter hole in the tow plate of the present invention.

A multi-purpose chisel plow disclosed by the prior art is observed in U.S. Pat. No. 4,524,837. This invention has a main frame, with one or more subsoiler assemblies including soil conditioning device, a trash-cutting implement, and a seedbed preparation device. A key feature of this invention in improving the soil conditioning is a rotatable member of the slot filtering assembly which fills soil voids in the plowed furrow left by the chisel plow apparatus. However, this invention does not reveal use of independent self-raising gas pressurized lift jacks mechanism attached to the chisel point plow. Further, it is likely that this apparatus is designed to be pulled by a conventional three-point hitch of a tractor. As such this disclosure is also patently distinct from the present invention.

U.S. Pat. No. 4,801,126 reveals a basic three-chamber lift jack having a gas pressurized hydraulic lift system. The commercial gas pressurized lift jacks apparatus disclosed therein, appears to he an early iteration of gas pressurized hydraulic system mechanisms. However, this patent does not show the independent self-raising gas pressurized lift jack mechanism in use as disclosed in the present invention.

SUMMARY OF THE INVENTION

In accordance with this invention, a detachable Sod Buster garden type chisel plow that is towed behind a small farm or garden tractor unit and which can loosen soil and plow to a depth slightly over sixteen inches. This apparatus includes a horizontal support frame affixed to two rotatable wheels and having two parallel support frame members which are hingedly attached to a transport device frame affixed to a garden tractor mounting plate type or tow bar hitch. The chisel plow is attached to a plow shaft, which is affixed to a horizontal jack support frame member. The chisel plow is pivotally attached at one end a bracket, which is also pivotally attached to support bracket. Plow engagement rope is threaded through pulleys and rope cleat attached to tee frame which is attached to the chisel plow shaft and attached to the wheel support frame. Pulling the plow engagement rope tightens the rope causing chisel plow to overcome the constant pressure exerted by two gas-pressurized lift jacks, also known as gas springs or gas pressurized lift supports, and into the soil for plowing.

Although only a few exemplary embodiments of the present invention have been described in detail above, those skilled in the art will readily appreciate that many modifications and substitutions are possible in the exemplary embodiments without materially departing from the novel teachings and advantages of the invention. Accordingly, all such modifications and substitutions are intended to be included within the scope of the invention as defined in the claims.

DETAILED DESCRIPTION OF DRAWINGS

Figure 1:
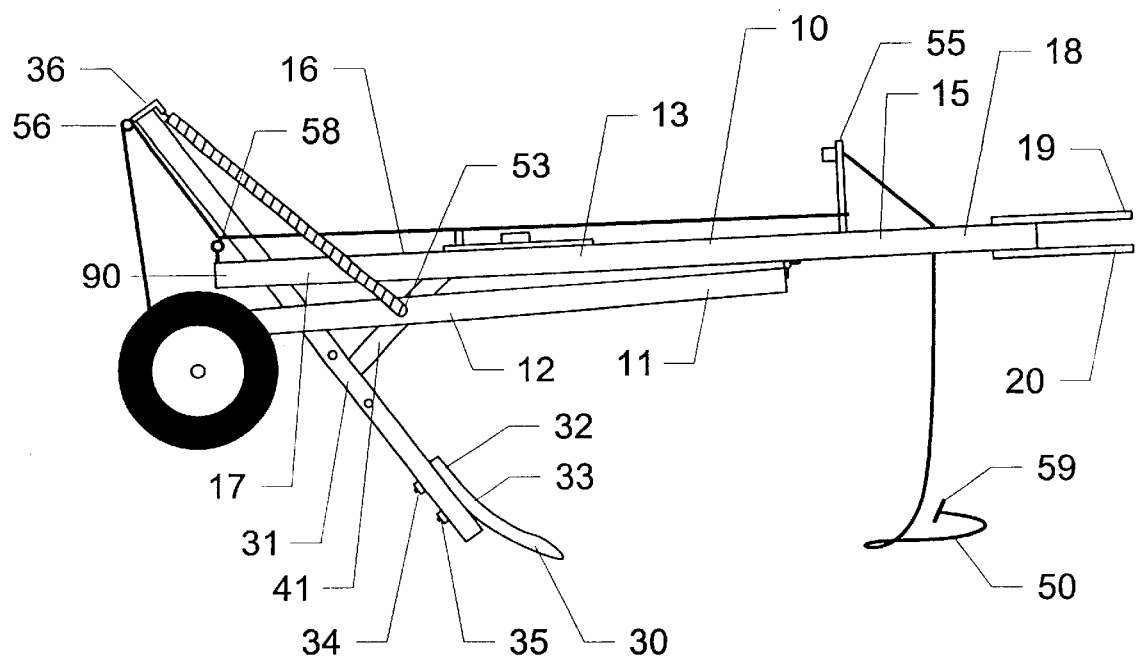
FIG. 1 is a right side view of the preferred embodiment of the detachable Sod Buster of this invention showing the chisel plow in full depth plow position.

Referring to the drawings for a better understanding of the present invention, this invention is susceptible to embodiment in several different forms. The description, which follows, should be viewed as an illustration of the principles of the invention and is not intended to limit this invention to the embodiments illustrated in the drawings herein.

Figure 2:
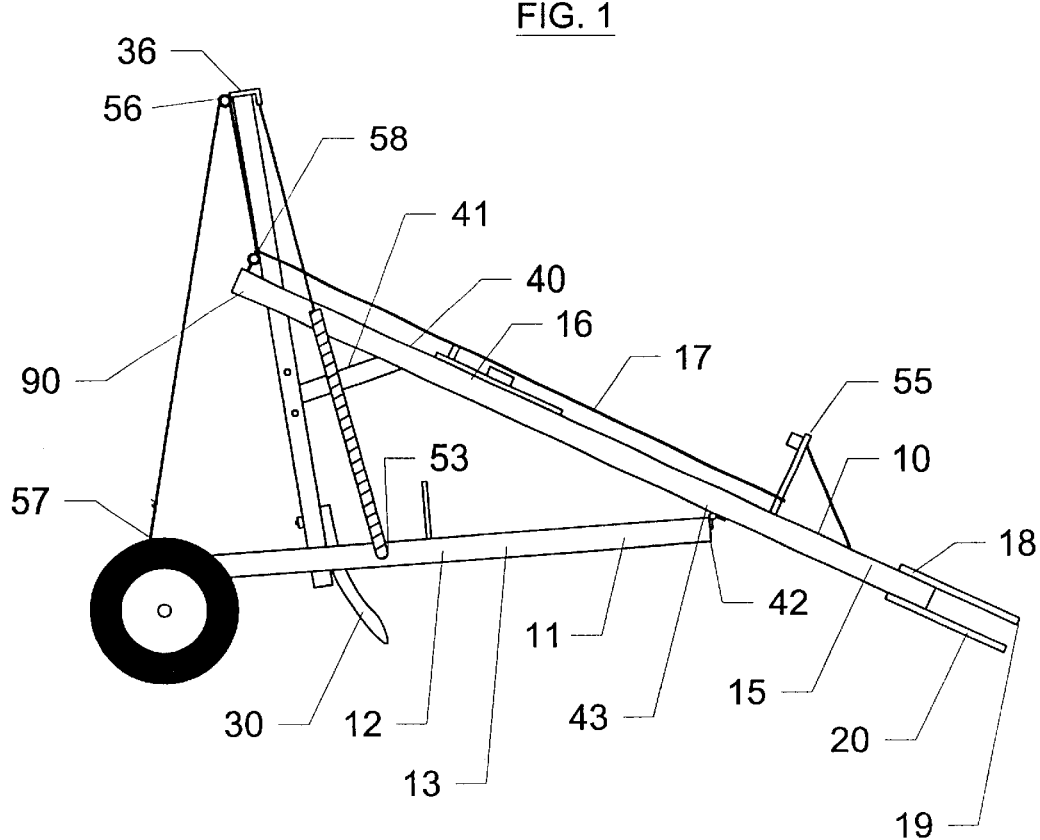
FIG. 2 is a right side view of the preferred embodiment of the detachable Sod Buster of this invention showing the chisel plow apparatus in a transport position.
Figures 3, 4:
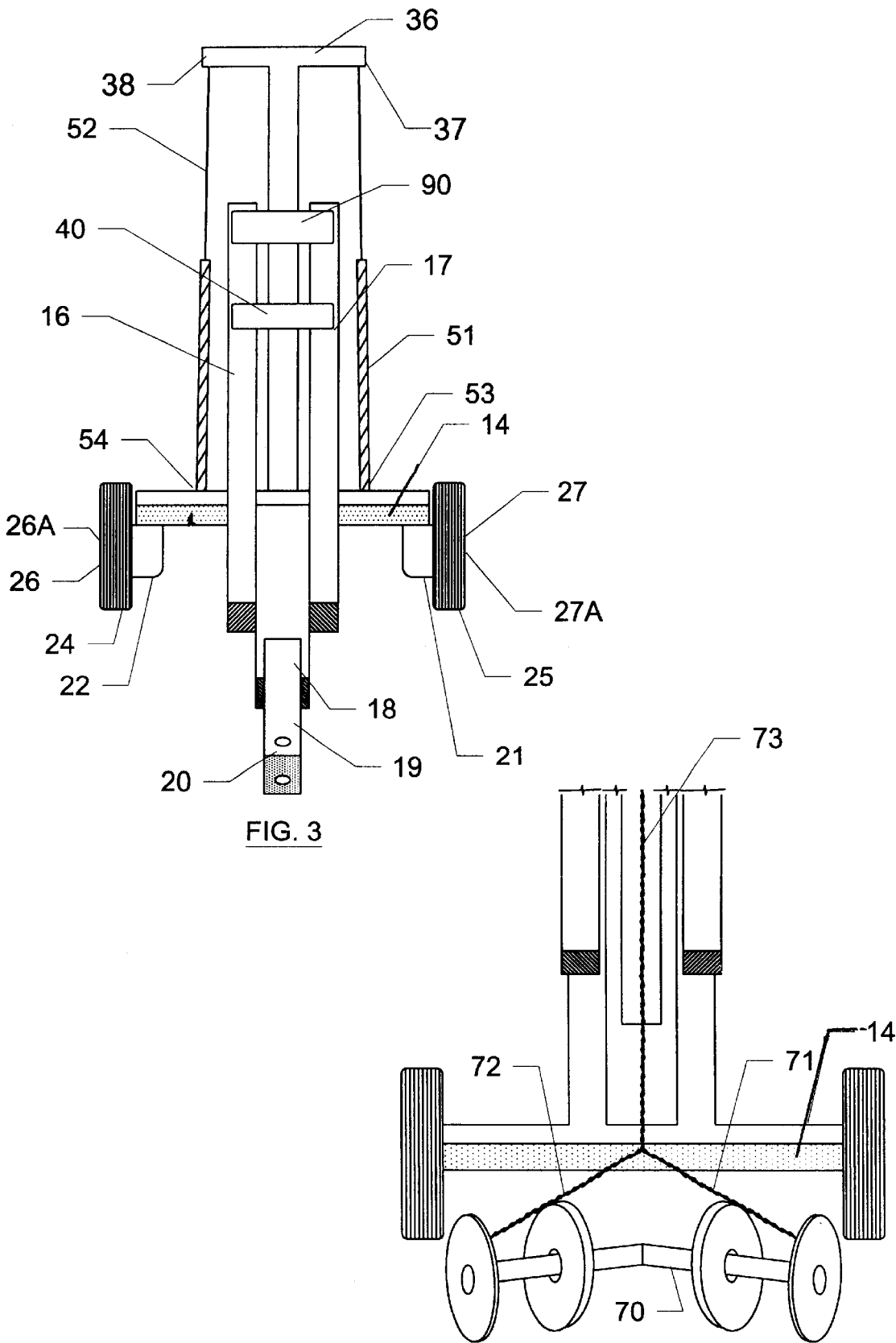
FIG. 3 is a front view of the preferred embodiment of the detachable Sod Buster of this invention showing the chisel plow apparatus in a transport position.
FIG. 4 is a cut-off top view of the disk attachment apparatus of the detachable Sod Buster chisel plow of this invention depicting the disk attachment in a transport position.

FIG. 1 is a right side view of the preferred embodiment of the detachable Sod Buster 10 apparatus showing the chisel plow up on blocks in order to depict the full depth plow position and disclosing the primary features of this apparatus. As shown in FIGS. 1 and 2 and 3, the Sod Buster apparatus is constructed of a horizontal support frame 11 consisting of two parallel support frame members 12 and 13 which are hingedly attached to the transport device frame 15 at one end. Wheel support frame 14 is rigidly attached crosswise to horizontal support frame 11 forming a 90-degree angle with each of the two parallel support frame members 12 and 13. Wheel support brackets 21 and 22 are rigidly and downwardly affixed forming a 90-degree angle to wheel support frame 14 at opposite ends to receive the Sod Buster apparatus wheels 24 and 25. The two Sod Buster wheels 24 and 25 are rotatively attached to their respective axle shafts 26 and 27 which are detachably mounted in the matching height positioning holes 26A and 27A;

Transport device frame 15 is similarly constructed of two transport support members 16 and 17 rigidly attached to a transport support extension member 18 located between transport members 16 and 17 at one end of transport support frame 15. Transport support extension member 18 is rigidly affixed to tractor mounting tongue hitch 19 which has hole 20 through the hitch components to attach the Sod Buster 10 apparatus to a farm or garden tractor. Support bracket 40 is affixed crosswise between members 16 and 17 rigidly joining these two members. End bracket 90 is affixed crosswise at one end of and between members 16 and 17 rigidly joining these two members.

As best observed in FIG. 2, horizontal support frame 11 is hingedly attached to transport device frame 15 with support frame member 12 hingedly attached at one end 42 to transport support member 16 and support frame member 13 hingedly attached at end 43 to and transport support member 17.

In the embodiment shown in FIG. 1, it is observed that chisel plow 30 is detachably affixed to chisel plow shaft 31 on one end by bolts 32 and 33 held in position by nuts 34 and 35. Horizontal lift jack support frame member 36 is rigidly affixed to one end of chisel plow shaft 31 to the form a 90 degree angle with chisel plow shaft 31.

As observed in FIG. 3, self-raising gas pressurized lift jack 51 is attached to the extended end member of lift jack support frame member 36 at attachment point 37 and self-raising gas pressurized lift jack 52 is attached to the opposite end of extended end member of lift jack support frame member 36 at attachment point 38. Self-raising gas pressurized lift jack 51 is also attached at the opposite end to support frame 12 at attachment point 53 and self-raising gas pressurized lift jack 52 is attached at the opposite end to support frame member 13 at attachment point 54. Chisel plow shaft 31 is rigidly attached to bracket 41, which is rigidly attached to support bracket 40. Plow engagement rope 50 with handle 59 at one end is threaded through single pulley 58 and cleat 55 and is next threaded through double pulley 56 attached to lift jack support member 36; then threaded through single pulley 57 attached to wheel support frame 14; threaded back through double pulley 56 again, and finally the plow engagement rope 50 is attached to wheel support frame 14 thereby comprising the rope and pulley system. Pulling of plow engagement rope 50 by handle 59 tightens the rope held by cleat 55 and causing the chisel plow shaft 31 with chisel plow 30 to be lowered by the rope and pulley system to overcome the constant pressure exerted by the two gas pressurized lift jacks 51 and 52 and engaged into the soil for plowing. Releasing of the plow engagement rope 50 by handle 59 from cleat 55 loosens the rope causing chisel plow shaft 31 with chisel plow 30 to be raised by the pressure of the two gas pressurized lift jacks 51 and 52 and disengaged from the soil for transport without plowing.

Figure 5:
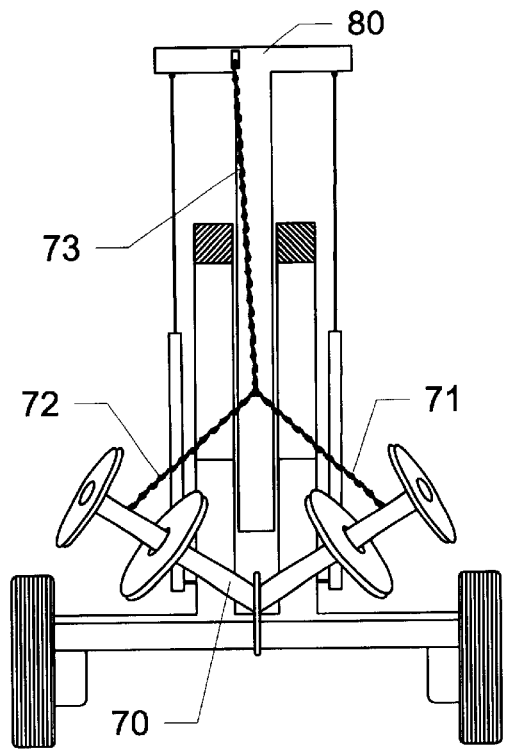
FIG. 5 is a rear view of the disk attachment apparatus of the detachable Sod Buster chisel plow of this invention depicting the disk attachment in a transport position.
Figure 6:
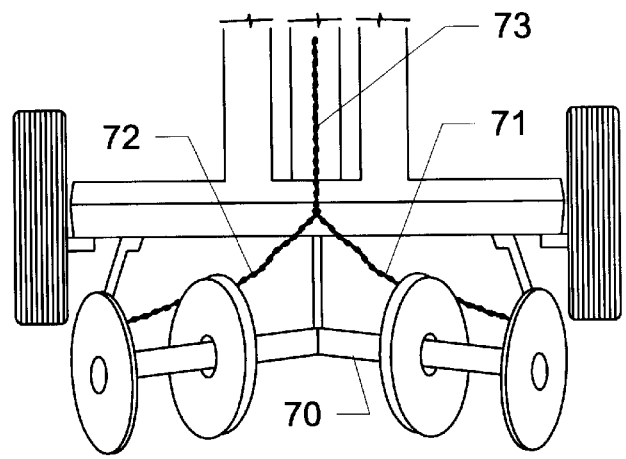
FIG. 6 is a cut-off rear view of the disk attachment apparatus of the detachable Sod Buster chisel plow of this invention depicting the disk attachment in a tilling position.

Optional features can be added to the detachable Sod Buster chisel plow 10 of this invention such as a disk attachment device as shown in FIGS. 4, 5 and 6. The disk attachment device can be effectively used with the chisel plow apparatus, which further tills and breaks up the already loosened soil and fills in the furrow opened by the chisel point plow with loose soil. FIG. 4 depicts a top view of the disk attachment 70 in a raised or transport position. FIG. 5 shows this same disk attachment 70 as a rear view in the transport position. FIG. 6 shows the disk attachment 70 in a lowered position ready for tilling the soil. Chain 73 is attached to the tee frame bar 80 at one end of the chain and, at the opposite end of the chain forms a 'y' with chain legs 71 and 72 which is attached to disk device attachment 70. Tee frame bar 80 is a frame attachment which is mounted into and rigidly affixed to lift jack support frame member 36, and is used to support and raise and lower all of the optional equipment features of the Sod Buster apparatus.

Figure 7:
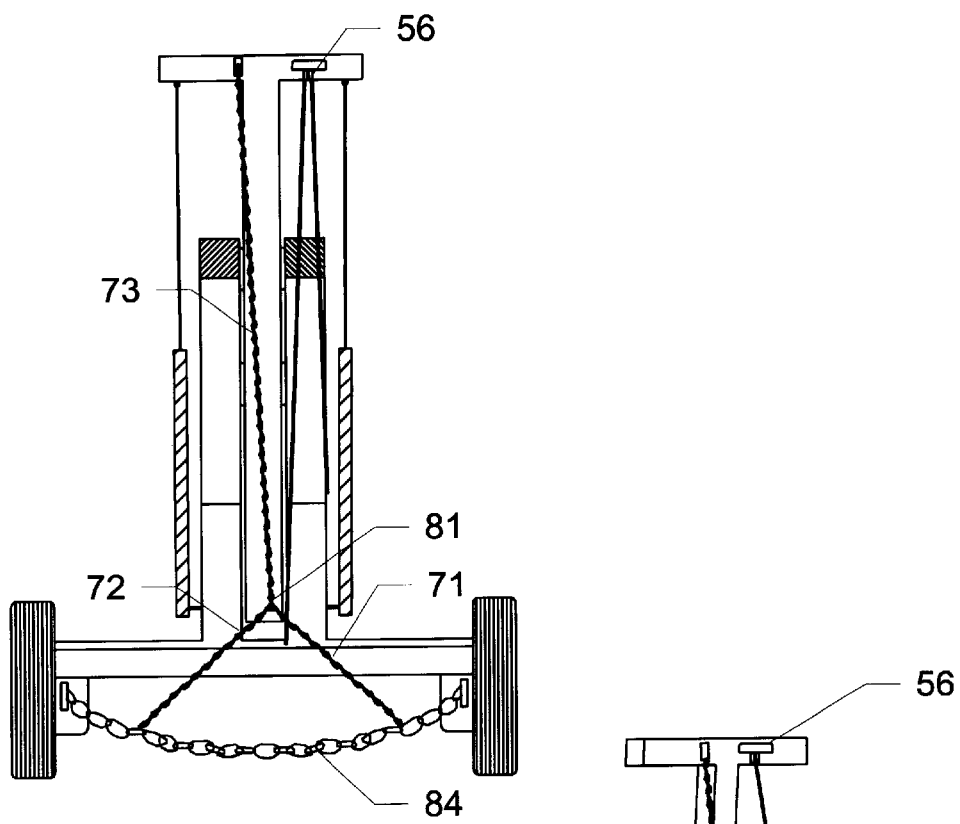
FIG. 7 is a rear view of the drag chain attachment of the detachable Sod Buster chisel plow of this invention depicting the drag chain attachment in a transport position.
Figure 8:
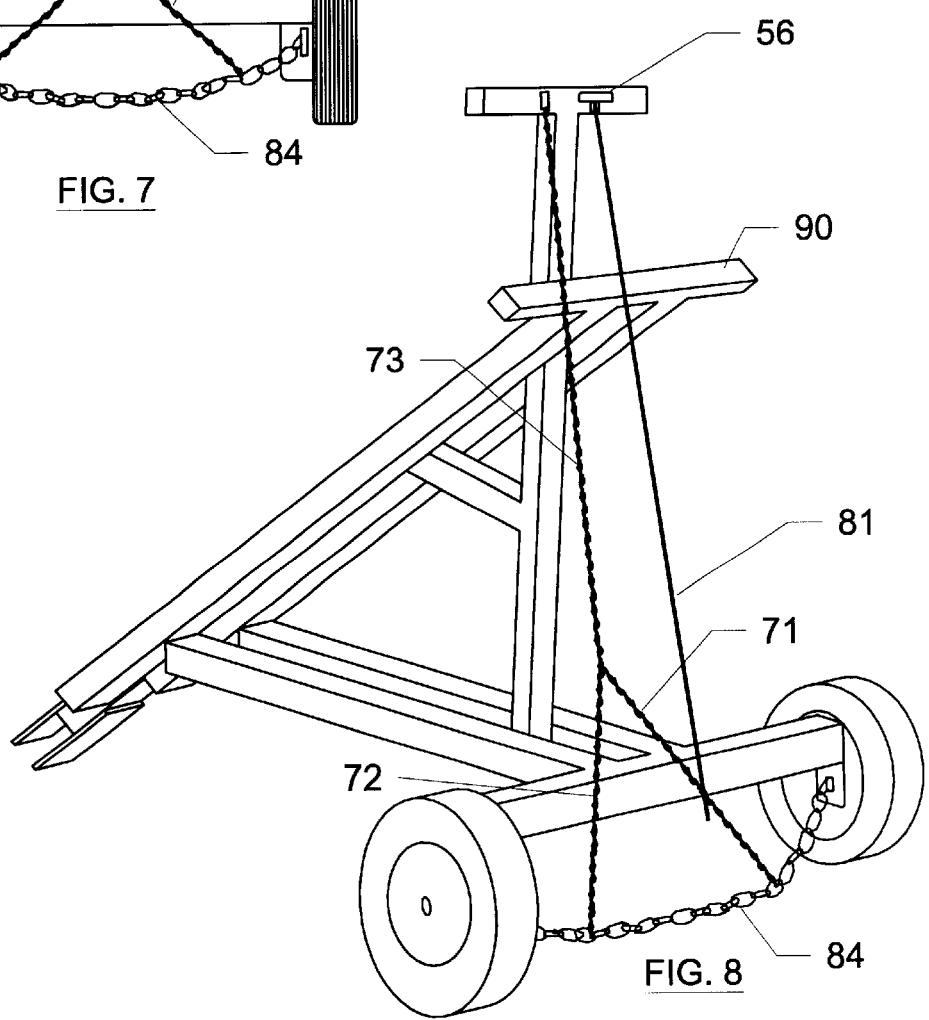
FIG. 8 is a side view of the drag chain attachment of the detachable Sod Buster chisel plow of this invention depicting the drag chain attachment in a ready to be engaged position.

Another optional feature is shown in FIGS. 7 and 8 with a drag chain that is used to fill the single furrow dug by the chisel plow after plowing. FIG. 7 depicts the drag chain 84 on the ground as it is used to fill a furrow dug by the chisel plow. Drag chain 84 is raised or lowered by the same lift chain 73 as the disk attachment to described above which is attached to tee frame bar 80. As seen in FIG. 8 the drag chain 84 is shown in an elevated position ready for transport which is accomplished by pulling of lift chain 73 thereby raising drag chain 84.

The Sod Buster apparatus of this invention may be constructed of varying materials. Durability, ease of fabrication, cost and the ability of the frame material to withstand stress and continuous shock while under load are important criteria in the selection of the material for this invention. Materials such as steel tubing, aluminum tubing, reinforced plastic tubing or wood may be used to construct the Sod Buster apparatus. The preferred material is rectangular steel alloy tubing with 2"×2" rectangular tubing being the preferred size for construction of the Sod Buster frames. It has also been found that a 10" diameter wheel with a tread width of 2½" works well with this invention.

What is claimed is:

1. A detachable chisel plow apparatus, which can plow one furrow of soil when pulled by a powered, means comprising:
   a horizontal support frame hingedly attached at one end to a transport device frame and attached to a wheel support frame having two rotatable wheels; said transport device frame having an end bracket at one end and a mounting hitch affixed to an opposite end;
   a plow assembly having a chisel plow detachably affixed to one end of a chisel plow shaft and a lift jack support frame attached at the opposite end of said shaft; two self-raising gas pressurized lift jacks each attached parallel to the other at opposing ends of the extended members of said lift jack support frame and attached at the opposite end to horizontal support frame members;

said plow assembly being pivotally attached to the transport frame; and a means to lower the plow assembly to overcome the pressure exerted by said two self-raising gas pressurized lift jacks.

2. A detachable chisel plow apparatus as in claim 1 in which said mounting hitch is a tongue hitch with a mounting hole through the tongue components.

3. A detachable chisel plow apparatus as in claim 1 in which the means to lower the plow assembly to overcome the pressure exerted by said two self-raising gas pressurized lift jacks is a rope threaded through a pulley system and cleat and attached to said wheel support frame.

4. A detachable chisel plow apparatus as in claim 3 with an attached disk device to till the soil, which can be raised and lowered.

5. A detachable chisel plow apparatus as in claim 3 with an attached drag chain to fill a furrow dug by the chisel plow, which can be raised and lowered.

6. A detachable chisel plow apparatus as in claim 3 with a tee frame bar rigidly affixed to said lift jack support frame.

7. A detachable chisel plow apparatus pulled by a powered means which can plow one furrow of soil comprising:

a transport frame having an end bracket affixed at one end and a tongue type mounting hitch affixed at an opposite end;

a horizontal support frame attached to a wheel support frame with two rotatable wheels and said horizontal support frame hingedly attached to a transport device frame and;

a plow assembly being pivotally attached to the transport frame and having one chisel plow detachably affixed to one end of a chisel plow shaft and a lift jack support frame attached at the opposite end of said shaft;

two self-raising gas pressurized lift jacks each attached parallel to the other at opposing ends of extended members of said lift jack support frame and attached at the opposite end to the horizontal support frame; and a means to lower the plow assembly to overcome the pressure exerted by said two self-raising gas pressurized lift jacks.

8. A detachable chisel plow apparatus as in claim 7 in which the means to lower the plow assembly to overcome the pressure exerted by the two self-raising gas pressurized lift jacks is a rope threaded through a pulley system and cleat and attached to said wheel support frame.

9. A detachable chisel plow apparatus as in claim 8 with an attached disk device to till the soil, which can be raised and lowered.

10. A detachable chisel plow apparatus as in claim 8 with an attached drag chain to fill a furrow dug by the chisel plow, which can be raised and lowered.

11. A detachable chisel plow apparatus as in claim 8 with a tee frame bar rigidly affixed to said lift jack support frame.

12. A detachable chisel plow apparatus pulled by a powered means which can plow one furrow of soil comprising:

a transport frame having an end bracket at one end and a mounting hitch affixed at an opposite end;

a horizontal support frame attached to a wheel support frame with two rotatable wheels and said horizontal support frame hingedly attached to a transport device frame and;

a plow assembly being pivotally attached to the transport frame and having one chisel plow detachably affixed to one end of a chisel plow shaft and a lift jack support frame attached at the opposite end of said shaft;

two self-raising gas pressurized lift jacks each attached parallel to the other at opposing ends of the extended members of said lift jack support frame and attached at the opposite end to the horizontal support frame;

and a means to lower the plow assembly to overcome the pressure exerted by said two self-raising gas pressurized lift jacks.

13. A detachable chisel plow apparatus as in claim 12 which the means to lower the plow assembly to overcome the pressure exerted by the two self-raising gas pressurized lift jacks is a rope threaded through a pulley system and cleat and attached to said wheel support frame.

14. A detachable chisel plow apparatus as in claim 13 with an attached disk device to till the soil, which can be raised and lowered.

15. A detachable chisel plow apparatus as in claim 13 with an attached drag chain to fill a furrow dug by the chisel plow, which can he raised and lowered.

16. A detachable chisel plow apparatus as in claim 13 with a tee frame bar rigidly affixed to said lift jack support frame.

* * * * *